(12) United States Patent
Loreskar et al.

(10) Patent No.: US 11,388,012 B2
(45) Date of Patent: Jul. 12, 2022

(54) APPLICATION CERTIFICATE

(71) Applicant: TRUSTONIC LIMITED, Cambridge (GB)

(72) Inventors: Chris Loreskar, Cambridge (GB); John Dent, Cambridge (GB)

(73) Assignee: Trustonic Limited, Cambridge (GB)

(*) Notice: Subject to any disclaimer, the term of this patent is extended or adjusted under 35 U.S.C. 154(b) by 125 days.

(21) Appl. No.: 16/642,992

(22) PCT Filed: Aug. 23, 2018

(86) PCT No.: PCT/GB2018/052393
§ 371 (c)(1),
(2) Date: Feb. 28, 2020

(87) PCT Pub. No.: WO2019/043360
PCT Pub. Date: Mar. 7, 2019

(65) Prior Publication Data
US 2020/0259668 A1 Aug. 13, 2020

(30) Foreign Application Priority Data
Sep. 1, 2017 (GB) .................................. 1714063

(51) Int. Cl.
*H04L 9/32* (2006.01)
*G06F 21/44* (2013.01)
(Continued)

(52) U.S. Cl.
CPC ............ *H04L 9/3265* (2013.01); *G06F 21/44* (2013.01); *G06F 21/53* (2013.01); *G06F 21/57* (2013.01)

(58) Field of Classification Search
CPC ... H04L 9/3265; H04L 63/101; H04L 63/064; H04L 63/0823; H04L 63/126;
(Continued)

(56) References Cited

U.S. PATENT DOCUMENTS 9,294,468 B1 3/2016 Kilbourn
2015/0295892 A1* 10/2015 Fox ...................... H04L 63/0823
726/15
(Continued)

FOREIGN PATENT DOCUMENTS

EP   2 608 477   6/2013
EP   3 113 058   1/2017

OTHER PUBLICATIONS

Combined Search and Examination Report of GB Application No. 1714063.3 dated Feb. 6, 2018, 6 pages.
(Continued)

*Primary Examiner* — Beemnet W Dada
(74) *Attorney, Agent, or Firm* — Nixon & Vanderhye P.C.

(57) ABSTRACT

A method for a device comprises enrolling a specified application installed on the device into a chain of trust provided by a private key infrastructure. In the chain of trust, a child certificate is attested as valid by an attestor associated with a parent certificate in the chain of trust. Enrolling includes generating an application certificate 20-A for verifying that the specified application is installed on the device 2. The application certificate is a descendant certificate of the device certificate associated with the device and the chain of trust.

23 Claims, 5 Drawing Sheets

(51) Int. Cl.
*G06F 21/53* (2013.01)
*G06F 21/57* (2013.01)

(58) Field of Classification Search
CPC ....... H04L 9/3263; G06F 21/44; G06F 21/53; G06F 21/57
See application file for complete search history.

(56) References Cited

U.S. PATENT DOCUMENTS

| | | | |
|---|---|---|---|
| 2016/0094560 A1* | 3/2016 | Stuntebeck | H04L 67/42 726/1 |
| 2017/0161505 A1* | 6/2017 | Campagna | G06F 9/45558 |
| 2017/0339564 A1* | 11/2017 | Momchilov | H04W 4/50 |
| 2018/0145971 A1* | 5/2018 | Mistry | H04L 63/0823 |
| 2019/0333031 A1* | 10/2019 | Kravitz | G06Q 20/401 |
| 2020/0137042 A1* | 4/2020 | Kannan, III | H04L 63/083 |

OTHER PUBLICATIONS

International Search Report and Written Opinion of the ISA for PCT/GB2018/052393 dated Nov. 22, 2018, 18 pages.

* cited by examiner

APPLICATION CERTIFICATE

This application is the U.S. national phase of International Application No. PCT/GB2018/052393 filed Aug. 23, 2018 which designated the U.S. and claims priority to GB Application No. 1714063.3 filed Sep. 1, 2017, the entire contents of each of which are hereby incorporated by reference.

The present application relates to the field of computing devices. More particularly, it relates to providing a chain of trust according to a public key infrastructure.

Increasingly, computing devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by devices which may provide sensor information such as temperature data or proximity information indicating whether a user is present, for example. In these scenarios, it can be important for a service provider to be able to verify that the device meets certain requirements in order to trust that interaction with the device is secure. The service provider may need to have confidence that the device has certain properties, e.g. that it was made by one of a group of trusted manufacturers, that it passed a certain quality assurance step, or that it has a certain hardware component or software application installed. Cryptographic techniques can be used to provide the required root of trust. For example a cryptographic key may be embedded in the device during manufacture and the device can later use that key to attest to an external verifier that the device has the properties expected by the verifier.

At least some examples provide a method for a device, the method comprising: enrolling a specified application installed on the device into a chain of trust provided by a public key infrastructure, wherein in the chain of trust, a child certificate is attested as valid by an attestor associated with a parent certificate in the chain of trust; wherein the enrolling comprises generating an application certificate for verifying that the specified application is installed on the device or attesting to an event associated with the specified application; and the application certificate is a descendant certificate of a device certificate of the device.

At least some examples provide a device comprising: processing circuitry configured to: enroll a specified application installed on the device into a chain of trust provided by a public key infrastructure, wherein in the chain of trust, a child certificate is attested as valid by an attestor associated with a parent certificate in the chain of trust; wherein enrolling of the specified application comprises generating an application certificate for verifying that the specified application is installed on the device or attesting to an event associated with the specified application; and the application certificate is a descendant certificate of a device certificate of the device.

At least some examples provide a method for a remote validator to validate whether a specified application is installed on a device or whether the specified application meets at least one required property; the method comprising: obtaining at least one application certificate associated with the specified application, where: the at least one application certificate is enrolled into a chain of trust provided by a public key infrastructure; in the chain of trust, a child certificate is attested as valid by an attestor associated with a parent certificate in the chain of trust; and each application certificate is a descendant certificate of a device certificate of the device; using the at least one application certificate to verify whether at least one attestation key held by the device is valid; and based on whether the at least one attestation key is valid, validating whether the specified application is installed or meets the at least one required property.

At least some examples provide a computer program for controlling a data processing apparatus to perform the method discussed above. A storage medium may store the computer program. The storage medium may be a non-transitory storage medium.

At least some examples provide an apparatus comprising processing circuitry to perform data processing; and a storage medium storing a computer program for controlling the processing circuitry to perform any of the methods discussed above.

Further aspects, features and advantages of the present technique will be apparent from the following description of examples, which is to be read in conjunction with the accompanying drawings, in which:

FIG. 1 schematically illustrates an example of an electronic device;

Figure 1:
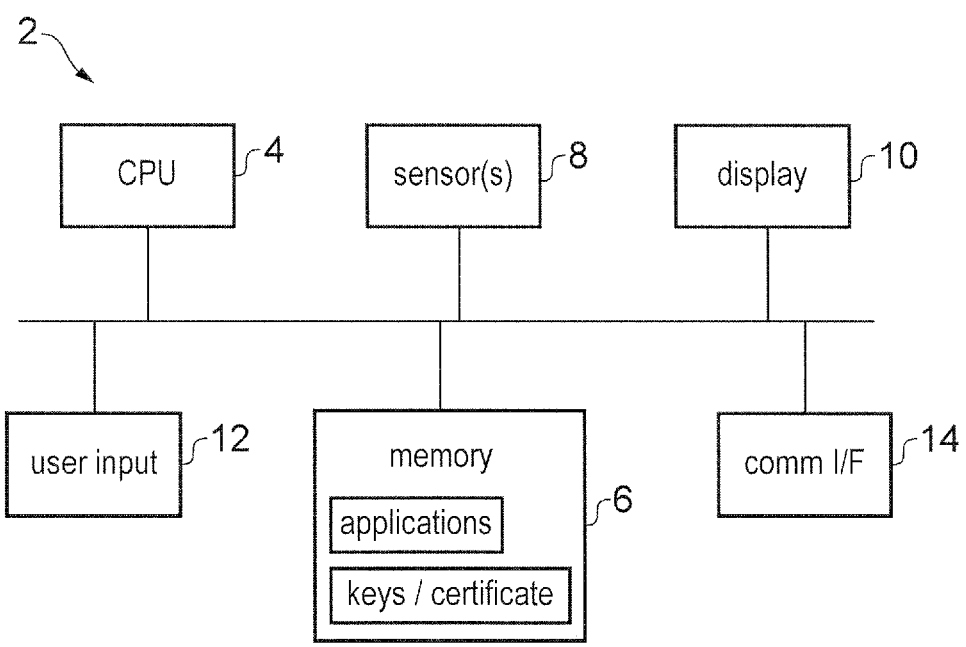

A computing device (e.g. an electronic device) may be enrolled into a chain of trust provided by a public key infrastructure. In the chain of trust, a child certificate may be attested as valid by an attestor associated with a parent certificate in the chain of trust. Typically each certificate provides a public key which corresponds to a private key which is secret to a particular device or source of messages, and the certificate can be used to verify that messages purporting to come from a particular source have been signed using the private key of that source.

A service provider can use a particular device's certificate to verify that messages purporting to come from a given device are valid (and hence obtain trust that the device has certain properties or is one of a known set of devices, which may be required for accessing a given cloud service). However, even if the device can be validated, it may still be possible for a malicious user to install an insecure application onto a known device in order to attempt to access an external service in an undesired manner.

In the technique discussed below, a specified application installed on the device may be enrolled into the chain of trust provided by a public key infrastructure (PKI), with the enrolling comprising generating an application certificate for verifying, according to the PKI, that the specified application is installed on the device. The application certificate is generated as a descendant certificate of a device certificate of the device in the chain of trust. Hence, the application certificate becomes a leaf node in the same PKI chain which includes the device certificate itself. The application certificate enables others to establish confidence that particular software is installed on the device, which may be important for some use cases. By generating the application certificate on the device in which the application is installed, it is not necessary to expose a private key associated with the application certificate outside the device (which would be the case if the certificate was generated by a remote certifying server).

In some instances the application certificate may be a child certificate of the device certificate. In this case there may be no intermediate certificates between the application certificate and the device certificate, with the device certificate being the direct parent of the application certificate. For example the application certificate may be signed with a private key for proving an identity of the device (that is, the private key corresponding to the public key associated with the device certificate).

Alternatively, the application certificate may not be a direct child certificate of the device certificate, but could be a further descendant, for example a grandchild or a great-grandchild certificate of the device certificate. For example, in some cases a particular device may have a number of different domains of operation, each associated with its own certificate generated as a child or descendant of the device certificate of the device. This enables actions triggered by the device to be attributed to one particular domain of operation. Hence, the application certificate could be a child certificate of one of the domain certificates rather than a child of the device certificate itself.

When the application certificate is generated, a private key is also be generated for the specified application, which corresponds to a public key associated with the application certificate. The private key can be made accessible to the specified application, or to selected other applications which may need to prove to a verifier that the specified application has been installed. Messages can be signed using the private key in order to establish that a particular application has been installed on the device, and external service providers can then use the corresponding application certificate to verify that the message has been correctly signed with the appropriate private key, e.g. by decrypting or validating the signature of the message using the public key associated with the application certificate. The private key and public key associated with the application certificate could for example correspond to values obtained from an elliptic curve pairing computation.

In some examples, the specified application may be enrolled into the chain of trust when the specified application is installed on the device. For example, the enrolment may occur in response to an installation command for installing the specified application onto the device.

The installation of the specified application may occur on condition that verification of the identity of the device according to public key infrastructure is successful. For example, part of the installation process may include checking that a message signed by a private key of the device can be validated using the device certificate. Hence, when a trusted application is to be installed in a device, the device first is attested to be valid before the installation is allowed to proceed and any application certificate generated for enrolling the application into the chain of trust. This can allow the originator of the application to verify that the intended device is not a fake device or potentially black-listed device, but is a legitimate device having certain properties.

In some cases the device may select whether or not to enroll a specified application into the chain of trust in dependence on information specified by the installation command for instructing installation of the specified application on the device. For example the installation command could specify an enrolment flag which indicates whether the application is to be enrolled into the chain of trust. Alternatively, the installation command could comprise an embedded certificate signing request which has a particular format defined according to the public key infrastructure, which can be executed on installation of the application to trigger enrolment into the PKI. Hence, the application provider may control whether devices are to generate application certificates for a particular application, by including the appropriate trigger information within the corresponding installation command provided to the device for installing the specified application.

Alternatively, the specified application may be enrolled into the chain of trust at a time other than installation of the specified application. For example, in some implementations, the enrolment and application certificate generation could take place on the fly each time the device needs to prove that the specified application is installed.

The enrolment could also be performed at the time of updating the specified application to a new version. The application certificate may specify a version identifier identifying a version of the specified application that is installed on the device. This enables an external verifier to verify the particular version of the application which is installed, which can often be as important as knowing whether the application is installed in the first place. For example, when a security vulnerability is identified in a particular application, the application provider may issue a new version with a patch for the security vulnerability, and service providers may then wish to ensure that subsequent accesses to a given service use the latest version of the application in order to prevent subsequent exploitation of the security vulnerability. By providing the version identifier within the application certificate, an external verifier can choose to reject a particular request for access to a service if the version of the application installed on the devices can no longer be accepted. Hence, when the specified application is updated to a new version on the device, a new application certificate may be generated for the specified application. Also a previous application certificate for the specified application may be discarded in response to updating the specified application to a new version, as well as the previously generated private key associated with that application certificate.

Alternatively, rather than discarding a previous application certificate associated with the specified application when generating a new application certificate for the same application, the enrolment of the previous application certificate in the public key infrastructure could be retained after generating the new application certificate. By recording multiple certificates for the same application in the public key infrastructure, which could correspond to different events associated with the specified application (such as upgrades to different versions, or a change in the configuration settings for the application), this can allow the device to attest to various parts of the specified application's history, which can allow increased confidence that there has not been interference with the application in the past, for example.

In some examples where multiple certificates are generated for the specified application, the new application certificate may reference the previous application certificate for the specified application. For example, the new application certificate could be generated as a child certificate of the previous application certificate in the chain of trust. Alternatively, both the new application certificate and previous application certificate could share the same parent certificate, but the new application certificate could include a field which provides a pointer to the previous application certificate. By including a reference to the previous application certificate in the new application certificate, this enables the order of the certificates in the chain of certificates associated with the specified application to be verified, and also enables notable absences in the chain of certificates to be identified by a verifier. For example, if the chain of certificates shows that the application was upgraded directly from version 1.2 to version 1.4, omitting version 1.3, then even if a security issue is subsequently identified associated with version 1.3, the device can attest that it never installed that version and so the specified application can be verified as safe. Hence, a chain of application certificates may be generated for attesting to the occurrence, or absence of occurrence, of respective events associated with the specified application.

A new application certificate may be generated for the specified application in response to a variety of application certificate update events. For example, the application certificate update event could be an event associated with a change to the specified application itself, such as an update of the specified application to a new version, or a change to a configuration setting for the specified application (e.g. personalisation of the application by the device, or enabling of a debug capability for the specified application).

In other examples, the application certificate update event could be an event associated with the surrounding software environment in which the specified application is executed, rather than a change to the application code or configuration settings of the specified application itself. For example, a new application certificate may be generated for the specified application in response to updating platform program code associated with the software environment in which the specified application is executed, and/or changing a configuration setting for the platform code. The platform program code for example could comprise at least one of: system firmware of the device; an operating system of the device; a trusted execution environment provided on the device; and program code for controlling or verifying updates to the program code of the specified application. For example, a change to code or configuration data that affects the security boundary provided by the trusted execution environment, or an update of a secure driver that provides storage services for the specified application, could trigger the generation of a new application certificate for the specified application, to enable others to verify the circumstances in which the specified application is operating on the device. It will be appreciated that these are just some examples of events which could trigger the generation of a new application certificate.

The device may have a normal execution environment and a trusted execution environment in which at least some data or program code is accessible which is inaccessible in the normal execution environment. For example, separation of the trusted execution environment from the normal execution environment may be enforced using a hardware architecture, such as the TrustZone® architecture provided by ARM® Limited of Cambridge UK. The enrolment of the specified application may performed under control of program code executing in the trusted execution environment. This can protect the keys generated during the enrolment process from access by less secure code operating in the normal execution environment.

Not all applications installed on the device need to be enrolled into the chain of trust. In some cases only some of the applications could be enrolled into the PKI. For example, in some cases enrolment into the PKI may be available for applications operating in the secure execution environment only.

Not all devices may be allowed to enroll their installed applications into the chain of trust. For example the device may be associated with at least one device permission or constraint defining capabilities of the device, including at least one permission or constraint which specifies whether the device is allowed to enroll applications into the chain of trust. Hence, in response to an installation command, the device may determine from the at least one device permission or constraint whether the device is allowed to enroll the specified application into the chain of trust, and may then enroll the specified application when the device is determined to be allowed to do so. The device permission or constraint could be a permanent permission or constraint set during the manufacture of the device, or could be a permission or constraint which can be varied by software executing on the device, or could be derived from permissions defined by an ancestor within the chain of trust, which may set constraints imposing limits on the extent to which devices or software associated with descendant certificates in the chain of trust are allowed to create further certificates, including application certificates. The device permission or constraint may be an internal control permission set within the device (e.g. by an ancestor process in the chain of trust), or may be a remote management permission set by a third party operating a remote managing device (e.g. a service provider of a service with which the device may enroll), rather than a user authorisation provided by the user of the device.

The at least one device permission or constraint may specify information to be included in the generated application certificate for the specified application, in the case when the device is allowed to enroll the application certificate. This can allow different information to be included in the application certificate for different devices. The information to be specified in the application certificate could be conditional on the device meeting certain criteria as specified by the at least one device permission or constraint. For example, for one device generating RSA keys may be acceptable, but for another device it may not be acceptable to generate RSA keys. In another example, the device permission or constraint could specify an absolute key size, or minimum key size allowed, so that different devices may generate keys with a number of bits appropriate to the level of security required.

When the application is enrolled into the chain of trust, the generated application certificate can be stored in a storage location accessible to the specified application. This could be a storage location within the device itself or a remote location. There is no need to contact a remote server during the certificate creation process, and in some embodiments the enrolment may be performed locally within the device. For example this could be useful for creating attestations without network connectivity present, e.g. for local trust usages or in a local network such as a device-to-device network.

Alternatively, the generated application certificate could be returned to a requester which triggers installation or update of the specified application, or provided to another party. For example the application certificate could be uploaded to a remote server so that third parties can then subsequently verify, using the application certificate, whether the specified application has been installed on the device.

In some examples, the enrolment of the application certificate into the chain of trust may involve registering the application certificate generated on the device with a third party who manages the certificates associated with the chain of trust.

Hence, the device may make the application certificate accessible to a verifier requesting verification of whether the specified application is installed on the device. This could be done by uploading the certificate to a remote server at the time of installing the application, or by storing the application certificate locally and then making the certificate available later. For example, when accessing the service which requires verification of whether the specified application is installed, the certificate could be provided by the device along with the message signed using the corresponding private key. Hence, it is not essential to store the certificate at a remote certifying server. The authenticity of the certificate can be verified by following the chain of trust right back to the root certificate. The root certificate may be attested as valid by an external certifying body separate from the device.

In some examples, when an application certificate and related private key are generated, the private key may be stored locally on the device, and the application certificate itself may be uploaded to a remote location and then deleted from the device, so that the device itself does not need to continue to store application certificates. This approach can be more suitable for Internet of Things type devices, for example, which may be extremely constrained in terms of memory capacity and power.

The application certificate could have a range of formats. However, in one example the application certificate may comprise a X.509 certificate. X.509 is an industry standard solution for validating attestations for devices and so by using the standard X.509 certificate for the trusted application as well then this improves compatibility with existing verification techniques.

The application certificate discussed above may not be the only certificate associated with the specified application. The application can also be associated with a software provider certificate which is signed by the provider of the software and provided to the device along with the installation command for installing the specified application. At the time of installation, the device may then validate the specified application using the software provider certificate, to determine whether the provider of the application can be trusted or the application code can be trusted, before installing the application on the device. For example, the software provider could include a hash of part of the software code in the software provider certificate, signed with the software provider's private key. On installation, the device can verify the signature of the hash using the software provider's public key associated with the software provider certificate, and verify the hash by comparing the hash against a result of hashing a portion of the received application code to be installed, to verify that the code has not been tampered with en route from the software provider. Unlike the software provider certificate, the application certificate is generated on the device which installs the corresponding application, and is attesting to the fact that a particular device has the specified application installed, rather than to the authenticity of the specified application or the software provider who provided the application.

FIG. 1 schematically illustrates an example of a computing device 2. In this example, the device is an electronic device 2, but in other examples the computing device could be an optical computing device which uses photons produced by lasers or diodes for computation, or a device which uses a combination of electronic and optical computing elements. The device 2 has processing circuitry (e.g. a central processing unit (CPU)) 4, and storage circuitry 6 (memory) for storing data and program code executed by the processing circuitry 4. The memory 6 may also store keys or certificates associated with a public key infrastructure. Clearly other data may also be stored within the memory 6. In some cases, the memory 6 may be partitioned into secure and less secure regions, with the secure region for example being accessible only from a trusted execution environment of the processing circuitry 4, while the less secure regions are accessible from both a trusted execution environment and a normal execution environment of the processing circuitry 4. Transitions of the processing circuitry 4 between the trusted execution environment and normal execution environment may be monitored and controlled according to a hardware architecture such as the TrustZone® architecture provided by ARM® Limited.

The device 2 may also have one or more sensors 8 for sensing external conditions such as temperature, pressure, infrared radiation, etc., a display 10 for displaying information to a user, a user input 12 for accepting input gestures from a user, and a communications interface 14 for communicating with other devices, for example through wireless protocols such as WiFi®, Bluetooth® or NFC, or through wired communications (e.g. Ethernet). It will be appreciated that FIG. 1 is just one example of a possible architecture for the device and other examples may have many other components shown in FIG. 1.

Figure 2:
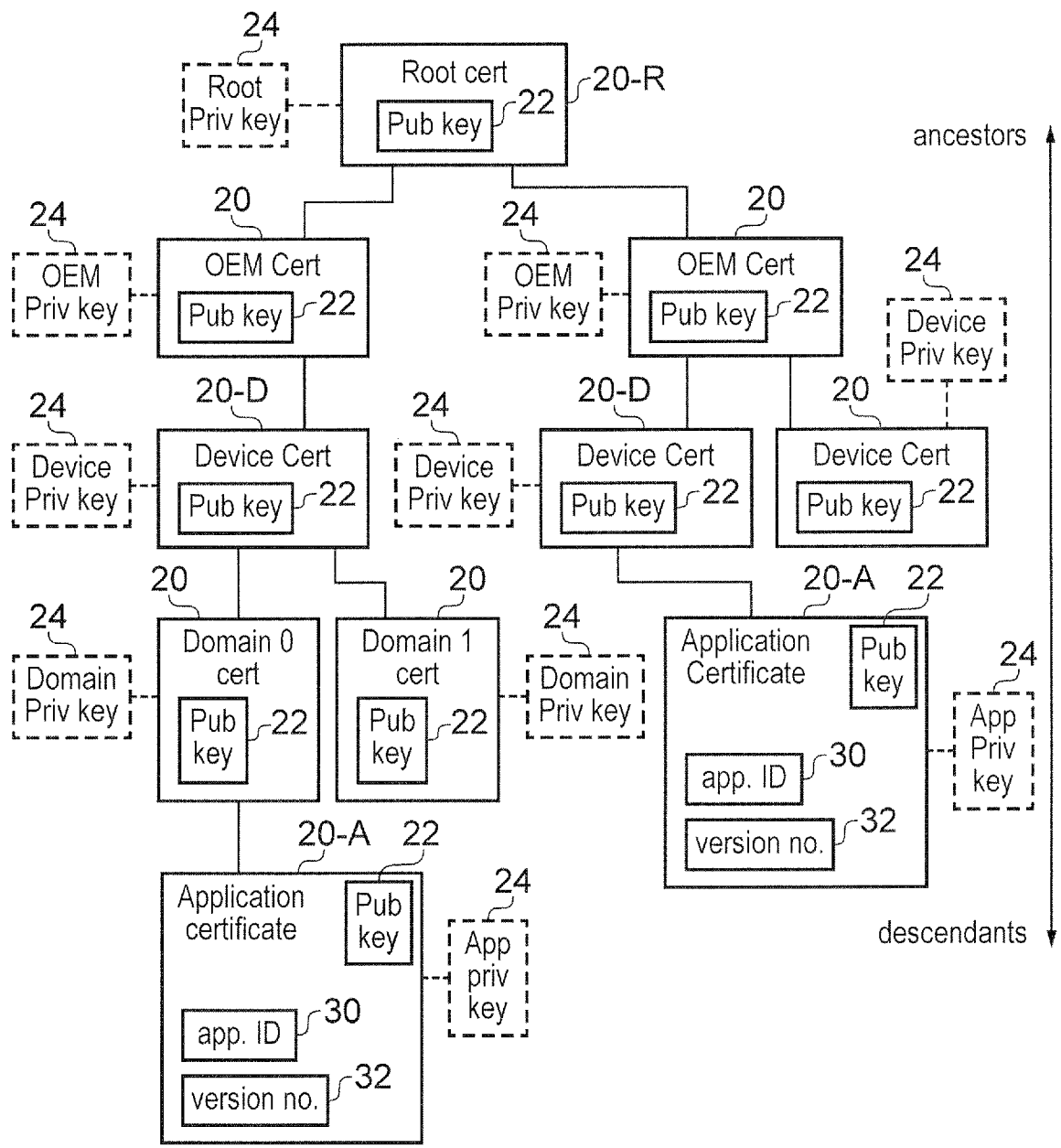
FIG. 2 shows an example of a chain of trust provided by a public key infrastructure, in which an application certificate is generated for a specified application installed on an electronic device, where the application certificate is a descendant of device certificate in the chain of trust.

FIG. 2 shows an example of a chain of trust provided by a public key infrastructure. The public key infrastructure is represented by a hierarchy of certificates 20 which can be used for verifying the source of messages. Each certificate 20 comprises a public key 22 which corresponds to a private key 24 held by the corresponding source to be attributed. For example, the private-public key pair could be a key-pair created according to RSA techniques or through elliptic curve cryptography. Trust in the chain of trust ultimately derives from a root certifying authority which is associated with a root certificate 20-R. The root certifying authority associated with the root certificate 20-R may attest as valid a number of child certificates for example corresponding to particular manufacturers of electronic devices (OEMs). Each OEM may then certify as valid particular electronic devices who may have their own certificates generated as children of the OEM certificates within the chain of trust. Hence, the chain of trust provides a tree of certificates, where a child certificate is attested as valid by an attestor associated with a parent certificate in the chain of trust. As the certificates are generated in successive generations, then when a particular certificate is determined to be valid, it can be implied that there was a chain of trust extending all the way back to the root certifying authority (an external party separate from the device 2), giving confidence in the authenticity of the source of messages, but with the delegated attestation provided by the chain avoiding the complexity of a single certifying authority having to directly attest to each device or source of messages itself. While FIG. 2 shows a particular hierarchy where an OEM creates device certificates for its manufactured devices directly, in other examples there may be multiple levels of manufacturer certificate between the root certificate 20-R and a device certificate 20-D. In addition to the public key 22 the certificates may include other information associated with the corresponding source of messages being authenticated. The certificates could have any format, but in one particular example may be defined according to the X.509 standard.

As shown in FIG. 2, the chain of trust can be extended so that an electronic device 2 in which a particular software application is installed can generate an application certificate 20-A which is a descendant in the chain of trust of the electronic device certificate 20-D of the device 2 which installed the application. The application certificate can be generated at install time, on an update of the application, or at a time subsequent to installation or update of the application. For some devices, the application certificate 20-A may be a direct child of the device certificate 20-D. For other devices, there may be at least one intermediate certificate between the device certificate 20-D and application certificate 20-A, such as a domain certificate associated with a particular domain of operation of a device in which the application was installed. The application certificate may include, in addition to a public key 22, a number of pieces of information about the application or the circumstances in which it was installed, such as an application identifier 30 identifying the particular application, a version number 32 identifying the particular version of the application that was installed, or other information such as metadata specifying the time at which the application was installed, the geographic location where the electronic device was located at the time of installation of the application, and so on.

Hence, a software provider may have a certificate created for its application (at installation time of the application or subsequent to installation), which may contain, among other things, an application identifier and the version number. The certificate may be signed into the same public key infrastructure as the electronic device itself, as a leaf node under the device's certificate, to provide traceability in how the application certificate came to exist. It is not necessary for the electronic device to have a network connection at the time of generating the application certificate, or to require access to a hardware security module for storing keys associated with the device certificate. The application certificate may be regenerated each time the application is updated to provide a new version number 32, in order to allow tracking of which particular version of the application is installed in the device. The X.509 format may be used for easier interoperability with third parties wishing to attest or personalise the application on the device, as X.509 is the de facto standard when it comes to identifying or certifying devices and keys.

Figure 3:
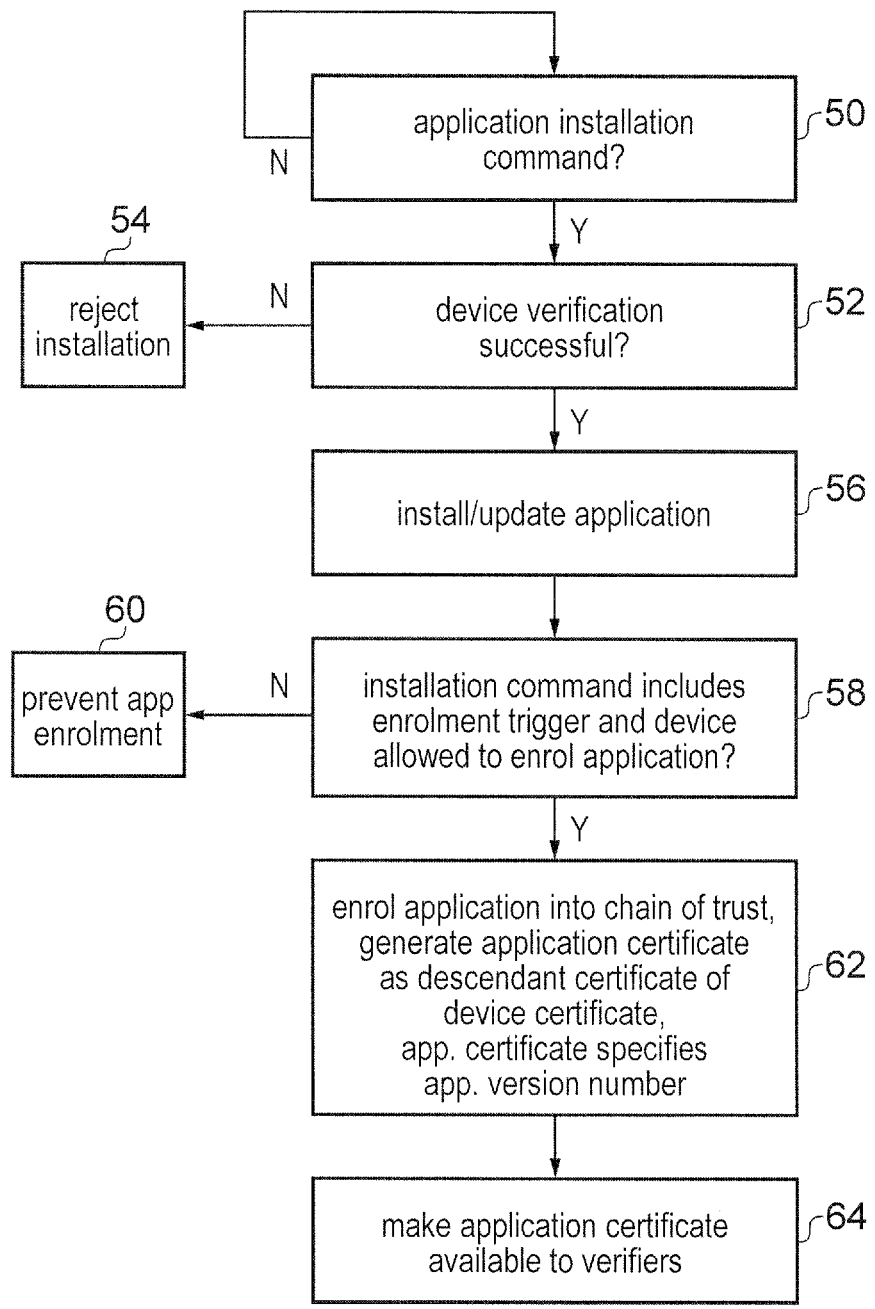
FIG. 3 is a flow diagram showing a method of installing an application on an electronic device.

FIG. 3 shows a flow diagram illustrating a method of installing an application on an electronic device. At step 50 the device determines whether an application command has been received for requesting installation of a specified application. When an application installation command is received, then at step 52 the electronic device is verified, for example by checking that it has the appropriate private key which can be verified using the device certificate in order to check that this is a valid device and not an unauthorised copy or a blacklisted device. If device verification is unsuccessful, then at step 54 installation of the trusted application is rejected. Hence, a provider of a given software application may require an electronic device to meet certain criteria in order for the application to be installed.

If device verification is successful, then at step 56 the specified application associated with the installation command is installed, or updated (if a previous version of the application already existed on the device). At step 58 the processing circuitry 4 of the device determines whether the installation command includes an enrolment trigger, and also determines whether the electronic device 2 is allowed to enroll applications into the public key infrastructure. The enrolment trigger information may be some information specified within the installation command which identifies whether or not, for this particular software application, an enrolment procedure is to be performed on installation of the software (the enrolment procedure including generation of an application certificate 20-A). For example, the enrolment trigger information could be a Boolean flag specified in the command, indicating whether this application should have a certificate created for it, or could be a certificate signing request defined according to the same format used for certificate signing requests issued by a parent node in the chain of trust to create a new child certificate and key pair for the PKI. Another option would be that enrolment trigger may be implicit, so that the command may specify if enrolment should not be performed, and any command which does not preclude enrolment may be assumed to comprise the enrolment trigger. Whether the device is allowed to enroll applications into the chain of trust may depend on constraints or permissions set for the device, which could be defined in a control register or within memory and could be fixed at manufacture of the device or could be variable.

If the installation command does not include an enrolment trigger, or the device is not allowed to enroll the applications into the public key infrastructure, then at step 60 the application enrolment is prevented.

If the command does include an enrolment trigger information and the device is allowed to enroll applications, then at step 62 the newly installed or updated application is enrolled into the chain of trust. This includes generating an application certificate which provides a public key corresponding to a private key associated with the application. The public and private keys may be newly generated at the time of enrolment. The application certificate is generated as a descendant certificate of the device certificate associated with the electronic device 2 on which the application is installed. Hence, the application certificates may be signed using a private key associated with the electronic device (or using the private key associated with a descendant certificate of the device certificate). The application certificate may specify the application version number as well as any other information of interest to subsequent verifiers.

At step 64 the application certificate is made available to verifiers who can then check that the particular version of the particular application has been installed in the device using the certificate. For example step 54 may comprise storing the generated certificate to the local storage 6 of the electronic device 2. It is not necessary to access a network at the time of enrolling the application. Instead, the certificate could be provided to a verifier at a later time, for example along with messages (signed using the corresponding private key 24) that are to be verified using the certificate. Alternatively step 64 could comprise uploading the certificate to a remote certificate storing server which could store certificates for a number of applications and devices. A third party server may, on receiving a message from the electronic device 2, verify whether the application has been installed, using the corresponding application certificate accessed from the certificate storing server.

While FIG. 3 shows an example where the application certificate is generated in response to installation or update of an application, similar steps could also be performed at arbitrary timings after the application has already been installed or updated, for example at the time of accessing a service which requires proof that the specified application has been installed. In this case, steps 62 and 64 may be performed in response to a request to access such a service, or on request by the specified application itself or a supervising application running the specified application.

In summary, a system can create a certificate for a Trusted Application (TA) when it is installed (or being updated) by the Trusted OS (or delegated entities) in a trusted execution environment, or a later time than install/update time. This certificate is also chained to the same PKI as the device itself belongs to.

Hence, a service provider to have a certificate (e.g. X.509) created for its TA. The certificate may contain a range of information, e.g. an application ID and the version of the installed TA. The certificate for the TA is also signed into the same PKI as the device itself, as a leaf under this device. This yields traceability in how this certificate came to exist. This certificate creation does not require the device to have a network connection, nor does it require access to a/the/PKI HSM where the keys related to said PKI exist. Also, the device certificate is re-generated when the TA is updated as well (as the certificate carries the TA's version). The certificate, being in X.509 allows for easier interoperability with server wanting to attest or personalize the TA on the device, as X.509 is the de facto standard when it comes to identities and keys in general.

An example is discussed in more detail below. When a TA is to be installed in a device, typically the device has been attested to be valid before this happens. That allows the originator to verify that the intended device is not an emulator or an otherwise (potentially) black-listed device. Once this has occurred, the TA is installed. However, during the installation of the TA, the installation command can be parsed for further actions to be performed. Potentially this could be as simple as a Boolean flag stating if this TA wants a certificate to be created, with no extra parameters permitted, or it could even be a fully-fledged certificate signing request embedded within the installation command. In addition, whether or not this installation command can legitimately ask for the system to generate a certificate, might depend on a permission or future constraint set by an ancestor node in the chain of trust. This permission may be an internal control permission defined within the device or a remote management permission defined by a third party, not a user permission granted by a user of the device.

In response to the installation command, the system may generate a X.509 certificate including at least the following properties: TA ID (identifying the application), and TA version.

The device ID of the device where this certificate was created is of less value, simply because the device certificate which becomes its parent, already contains the aforementioned device identifier, but the device ID could still be included in the certificate if desired. This above list is not exhaustive and is shown purely for illustrational purposes. The certificate may be signed by the device's own private key, i.e. the so called "device key", for which there also exists a device certificate which becomes the parent of this newly generated certificate.

Thus the chain then looks like this:

[Root]→[OEM]→[Device Certificate]→[TA Certificate]

Alternatively if multiple Security Domains are set up on the device, each domain may have a corresponding certificate, and the TA certificate could be generated as a child of one of the Domain certificates, e.g.:

Root→Device→OEM→SUID/Device Certificate→Root SD (UUID: 603exxyyzz . . . )→L1 (UUID: aabbccdd . . . )→L2 (UUID: 11223344 . . . )→TA certificate.

Providing certificates associated with particular ODMs, OEMs, or security domains on the device enables a more flexible manufacturing structure.

Once the certificate is created, it can be stored in the TA's storage 6 with a designated filename, either defined by the installTA command itself, or known in advance by the system (and the service provider). Optionally, the certificate can be returned as part of the installation command's returned payload for a simpler transfer of it to a remote party (this avoids starting up the TA just to extract said certificate).

When the TA is to be updated, a new certificate is created for the TA—this is because the TA's version will have changed and thus the old certificate is now obsolete and subsequently overwritten. In some cases, there may only ever be one certificate for the TA, even if it's been installed and updated several times, as the certificate should only match the latest installed version. Also, due to the update of a TA, an old TA certificate cannot attest this new one anyhow, so retaining copies of them seems infeasible. Nevertheless, it would be possible to retain old certificates if desired.

This approach using the electronic device 2 to sign the TA certificate into a PKI chain has several benefits:

No need to contact a server for the certificate creation—it is all local. Can thus be used to create attestations without network connectivity present (i.e. for local trust usages, or in a local network if so required—like device to device).

By signing the TA certificate into the same chain as the device itself, the chain is extended to also include Trusted Application—all tied up to the root of the chain of trust. This is valuable as attestation is all in the same chain (and also provides a PKI attested audit log).

By using standard X.509 certificates, industry standard solutions can be used to validate attestations from the device/TA device without the need to create new proprietary ones (or use other complex solutions).

Figure 4:
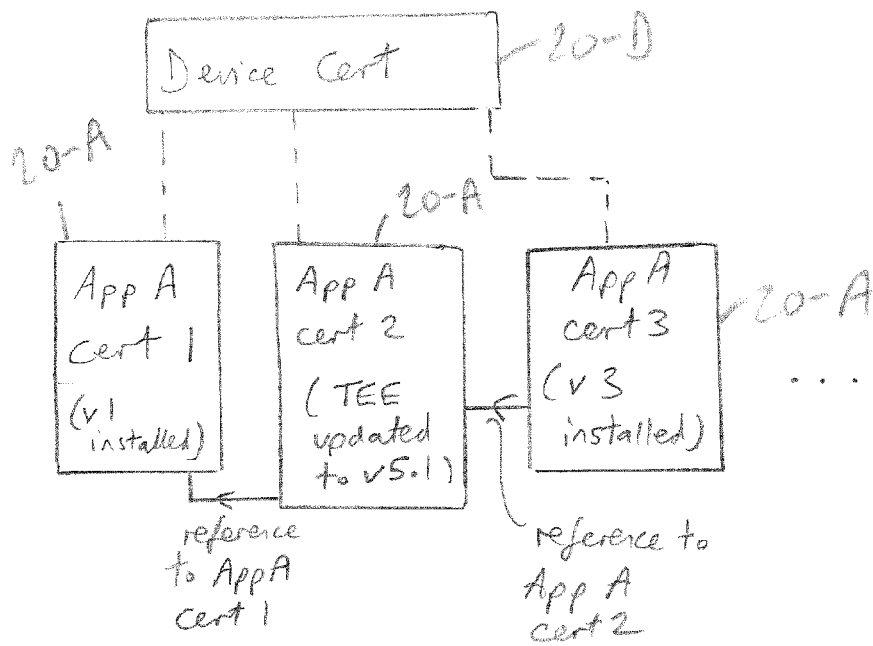
FIG. 4 illustrates an example of enrolling a chain of application certificates associated with a specified application.

In the example of FIG. 2, a single application certificate 20-A is shown for a given application installed on the device 2. However, as shown in FIG. 4, it is also possible to enroll two or more application certificates in the PKI, each associated with the same application A installed on the device. In FIG. 4, for conciseness the root certificate 20-R, OEM certificates and domain certificates are not shown, but could still be provided (the dotted line between the device certificate 20-D and the application certificates 20-A indicates that optionally a domain certificate 20 could be provided as an intermediate step in the chain of trust, although this is not essential).

Each application certificate 20-A corresponds to a given event associated with the history of the specified application. For example, the first application certificate corresponds to version 1 of the application being installed, the second application certificate corresponds to a version upgrade of the trusted execution environment in which the application is executed, and the third application certificate for the same application A corresponds to a new version 3 of the application being installed. Each new application certificate contains a reference to the previous application certificate for the same reference. In this example, this is provided by including a pointer to the previous application certificate in a field of the certificate other than the field indicating the parent certificate (e.g. in an extension (object ID) field of an X.509 certificate). However, it would also be possible to generate the new application certificate as a child certificate of the previous application certificate for the same application.

Hence, a certificate chain is extended each time a code change or configuration change occurs, not only associated with the application itself, but also with its underpinning platform environment (e.g. trusted execution environment or firmware). This means that when a trusted application makes an attestation, by demonstrating possession of the Attestation key for any application certificates, the application can not only demonstrate its identity, but also demonstrate that no non-trustworthy code has ever been able to interfere with any of the application's stored state in the past. Such a proof can be important in high trust settings, such as high value commerce.

Hence, each time a behaviour-impacting change is incurred, however minor, software executing on the device 2 (e.g. the underlying trusted execution environment (TEE), or secure program code for controlling or verifying updates to program code of the specified application) may extend (or create) a certificate chain that describes the TA's history. Behaviour-impacting changes may include:

A change to the application code of the specified application;

A change to platform program code of the device (e.g. the TEE code, program code for controlling or verifying updates to the specified application, an operating system of the device, or the underlying firmware of the device);

A configuration change to the platform program code;

The personalization of the application itself by the platform program code;

A configuration change to the application itself, such as the enabling of a debug capability;

A change in any code, or configuration thereof, that affects the security boundary provided by the TEE, such as the disablement of rollback-detection, or the update of the secure driver that provides storage services.

For example, consider an application is freshly installed on a TEE. An initial certificate may be created evidencing the application's code (e.g. version v1.2, together with a code hash) and the underlying platform codebase (e.g. TEE version and code hash, etc.). Perhaps the same application is later upgraded to v1.4. In this case, a subsequent certificate is created evidencing the new application code (version+ code hash). That certificate may include a reference to the immediate prior version of the application code, e.g. by either a specific Object ID (or other field of the certificate) that references the prior certificate, or by making the certificate a chain of Certificate Authority certificates (with the new certificate a child certificate of the immediate prior certificate). Hence, if it is found that, say, version 1.3 of the application was a known bad code version that leaked keys for example, then the application can conclusively prove, through attestation and evidencing the supporting certificate chain, that the security vulnerability has never been exploitable in the past, since v1.3 was never installed on the device. In order to support this, each time the application is upgraded or another application certificate updating event occurs, the Attestation key associated with the latest certificate changes. The management of the generation of new certificates can be performed by platform program code on the device 2, such as the program code for controlling/ verifying updates to the program code of the specified application.

Figure 5:
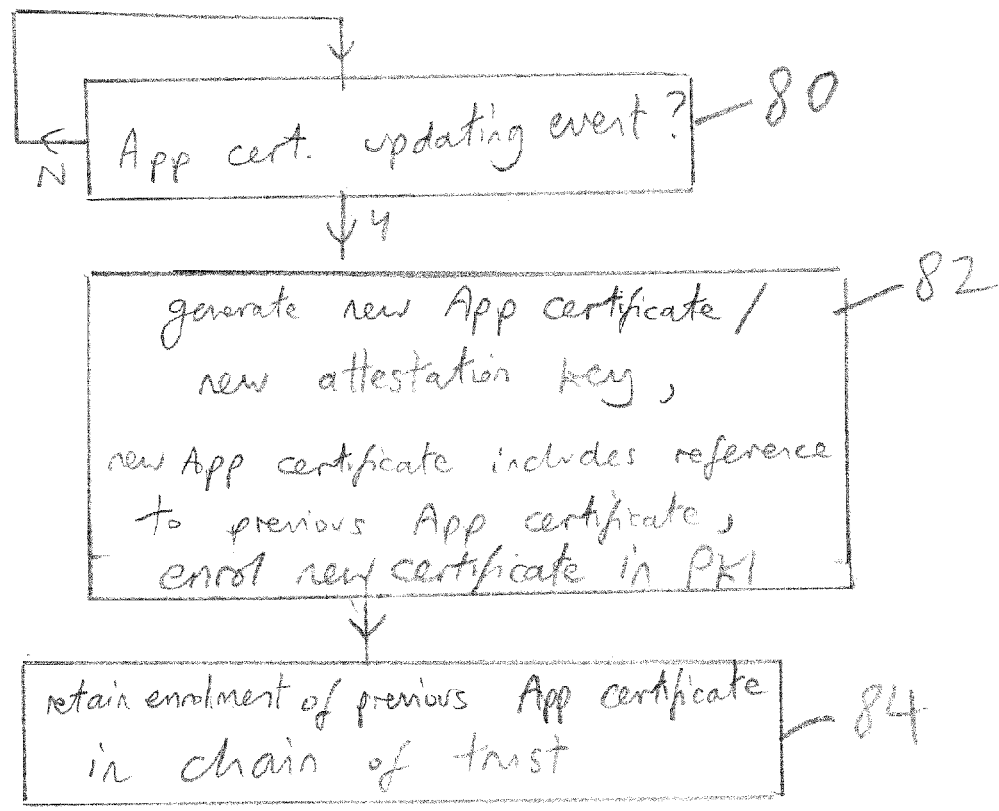
FIG. 5 is a flow diagram showing a method of generating a new application certificate in response to an application certificate updating event associated with a specified application.

FIG. 5 shows a flow diagram illustrating a method of generating a new application certificate. At step 80 the platform code of the device 2 detects whether any application certificate updating event has occurred for a specified application, which could be any of the behaviour-impacting changes listed above, for example. When an application certificate updating event occurs, at step 82 the platform program code controls the device 2 to generate a new application certificate for the specified application. A private/public key pair is generated, with the private key being used as the attestation key held by the device and the public key being provided with the certificate to enable third parties to verify whether the device has the private (attestation) key. The new certificate may be signed based on the private key of its parent certificate (e.g. the device certificate 20-D). If the new certificate is not the very first certificate generated for the application, the new certificate may include a reference to the immediately preceding application certificate in the chain of certificates generated for the application. The new certificate is enrolled into the PKI together with its public key. For example, the new certificate and related public key may uploaded to a certificate managing server, and then discarded from the device 2. Alternatively, the device may retain the certificate and/or public key. Regardless of whether the certificate and public key are retained, the private (attestation) key is retained by the device in secure storage protected from unauthorised access by the trusted execution environment. At step 84, enrolment of the previous application certificate is still retained in the chain of trust, following generation of the new application certificate. Hence, it is not necessary to delete any previous application certificates associated with the specified application. Retaining multiple certificates for the same application helps to enable more detailed verification of the history of the application.

Figure 6:
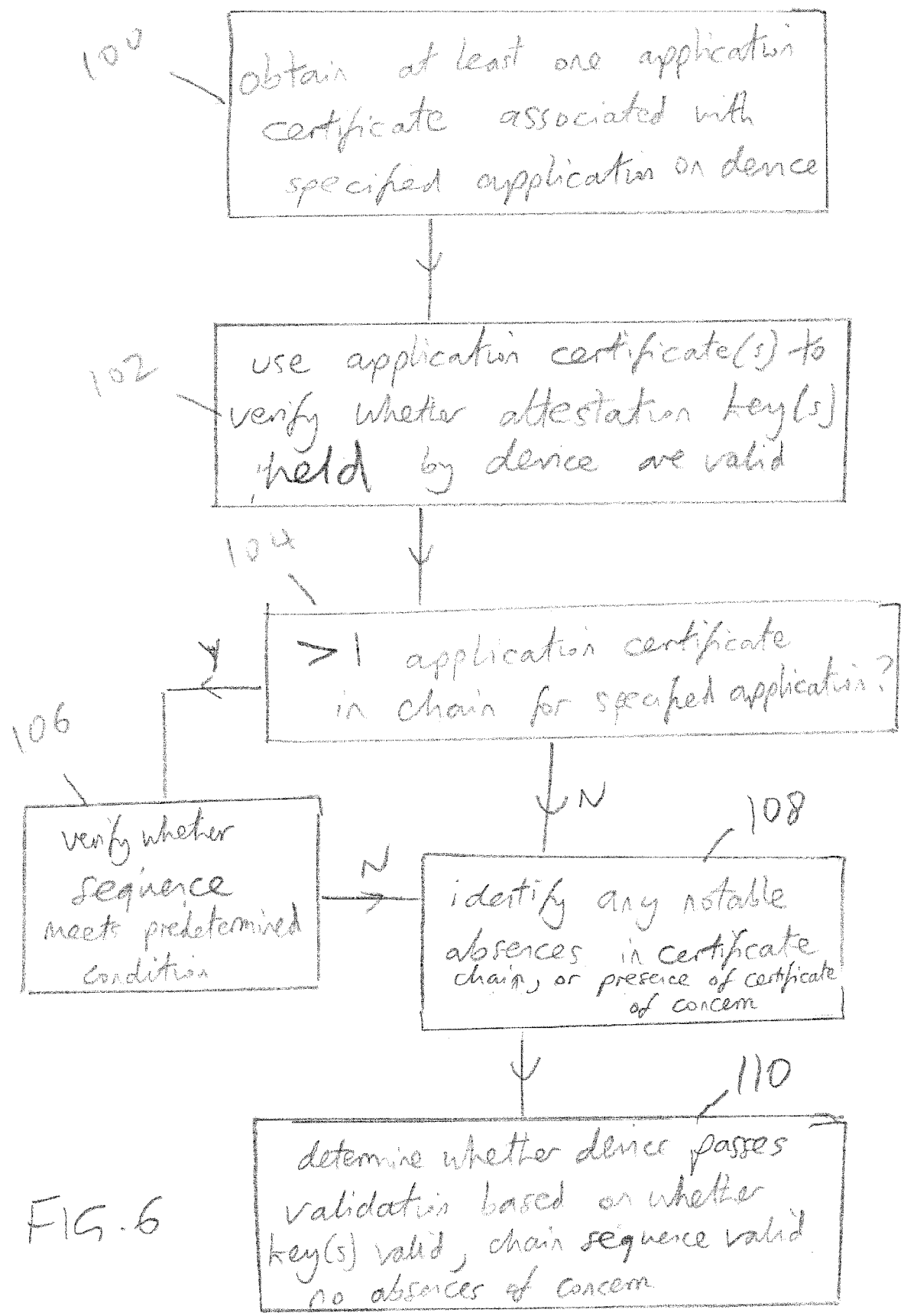
FIG. 6 is a flow diagram showing a method of validating a device based on at least one application certificate associated with a specified application.

FIG. 6 is a flow diagram showing a method of validating a device 2 based on the application certificate(s) associated with a specified application on the device. The method can be performed by a third party validator (separate from the device 2), such as a service provider operating a service (e.g. healthcare, banking, public services provision, etc.) with which the device is seeking to enroll. Also, the third party validator could be a validation service provider to whom such service providers may delegate validation functionality. At step 100 the validator obtains at least one application certificate associated with the specified application on the device. For example, the certificates may be obtained from a certificate database stored on a remote server, based on a device identifier provided by the device in the request which triggered the validation of the device.

At step 102 the validator uses the application certificate(s) to verify whether one or more attestation keys held by the device are valid. For example, the public key(s) associated with the application certificate(s) may be used to validate one or more messages signed or encrypted by the device based on the corresponding attestation keys. If the validation based on the public keys is successful then this may indicate that the device is the authentic device associated with the application certificates and that each of the events attested by the corresponding certificates can be trusted as having taken place.

At step 104 the validator determines whether the application certificate chain for the specified application includes more than one application certificate. If so, then at step 106 an additional verification step is performed to check whether the order of the certificates in the sequence meets a predetermined condition. For example, if the order of events occurring is suspicious or impossible then this may indicate that there has been tampering with the device.

Regardless of whether step 106 is performed, at step 108 the validator identifies whether there are any notable absences in the certificate chain provided for the specified application. In some cases, an absence of a given certificate from the certificate chain could be a positive factor indicating that the device may be safe to validate (e.g. because there is no certificate corresponding to a known bad version of the application code). In other cases, the absence of a given certificate from the certificate chain may be a negative factor, if a certain upgrade or configuration setting which is considered critical to the safe functioning of the application has not been made. Also at step 108, in some examples the validator may determine whether a certificate is present in the chain which poses a concern, e.g. a certificate indicating that a bad version of the application which has been found to have leaked keys was previously installed on the device, or a certificate indicating that a configuration change was made to the application which disabled a function required for security. For example, the validator could have access to a "prohibited list" identifying certificates associated with events which if occurred would require the validation to be failed.

At step 110, based on whether the attestation keys have been verified as valid, whether the order of the sequence of chained certificates is valid, whether there are any absences of concern in the certificate chain, and/or whether any prohibited certificate associated with an event of concern has been identified in the chain, the validator determines whether the device 2 (including any software executing on the device, such as the TEE, application, firmware, or other controlled subsystem) passes the validation. Whether a particular device passes the overall validation test may be a multi-factor test and a number of different criteria may be evaluated in order to determine whether the device passes the validation. Nevertheless, by enabling a chain of certificates to be defined for a given application to attest to various events in the history of the application code itself and the surrounding platform environment, and enrolling each of those certificates into the same public key infrastructure which contains the device certificate itself, this enables increased trust in the application code executing on a device, and hence in the device itself.

Further example arrangements are set out in the following clauses:

(1) A method for an electronic device, the method comprising: enrolling a specified application installed on the electronic device into a chain of trust provided by a public key infrastructure, wherein in the chain of trust, a child certificate is attested as valid by an attestor associated with a parent certificate in the chain of trust; wherein the enrolling comprises generating an application certificate for verifying that the specified application is installed on the electronic device; and the application certificate is a descendant certificate of a device certificate of the electronic device.

(2) The method of clause (1), wherein the application certificate is a child certificate of the device certificate.

(3) The method of clause (2), wherein the application certificate is signed with a private key for proving an identity of the electronic device.

(4) The method of any of clauses (1) to (3), comprising generating a private key for the specified application corresponding to a public key associated with the application certificate.

(5) The method of any of clauses (1) to (4), wherein the specified application is enrolled into the chain of trust when the specified application is installed on the electronic device.

(6) The method of clause (5), wherein the specified application is installed on condition that verification of the identity of the electronic device according to the public key infrastructure is successful.

(7) The method of any of clauses (1) to (6), comprising selecting whether or not to enroll the specified application into the chain of trust in dependence on information specified by an installation command for instructing installation of the specified application on the electronic device.

(8) The method of clause (7), wherein the installation command specifies an enrolment flag specifying whether the application is to be enrolled into the chain of trust.

(9) The method of clause (7), wherein the installation command comprises an embedded certificate signing request having a format defined according to the public key infrastructure.

(10) The method of any of clauses (1) to (9), wherein the electronic device has a normal execution environment and a trusted execution environment in which at least some data or program code is accessible which is inaccessible in the normal execution environment; and the enrolling of the specified application is performed under control of program code executing in the trusted execution environment.

(11) The method of any of clauses (1) to (10), wherein the application certificate specifies a version identifier identifying a version of the specified application installed on the electronic device.

(12) The method of any of clauses (1) to (11), comprising generating a new application certificate for the specified application in response to updating the specified application to a new version.

(13) The method of any of clauses (1) to (12), comprising discarding a previous application certificate for the specified application in response to updating the specified application to a new version.

(14) The method of any of clauses (1) to (13), comprising determining, in dependence on at least one device permission or constraint defined for the electronic device, whether the electronic device is allowed to enroll the specified application into the chain of trust; wherein the specified application is enrolled into the chain of trust when the electronic device is allowed to enroll the specified application into the chain of trust.

(15) The method of clause (14), wherein said at least one device permission or constraint specifies information to be included in the generated application certificate for the specified application.

(16) The method of any of clauses (1) to (15), comprising storing the generated application certificate in a storage location accessible to the specified application.

(17) The method of any of clauses (1) to (16), comprising returning the generated application certificate to a requester which triggered installation or update of the specified application.

(18) The method of any of clauses (1) to (17), wherein the electronic device is configured to make the application certificate accessible to a verifier requesting verification of whether the specified application is installed on the electronic device.

(19) The method of any of clauses (1) to (18), wherein the application certificate comprises an X.509 certificate.

(20) An electronic device comprising: processing circuitry configured to: enroll a specified application installed on the electronic device into a chain of trust provided by a public key infrastructure, wherein in the chain of trust, a child certificate is attested as valid by an attestor associated with a parent certificate in the chain of trust; wherein enrolling of the specified application comprises generating an application certificate for verifying that the specified application is installed on the electronic device; and the application certificate is a descendant certificate of a device certificate of the electronic device.

(21) A computer program for controlling a data processing apparatus to perform the method of any of clauses (1) to (19).

(22) A storage medium storing the computer program of clause (21).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for a device, the method comprising:
determining, in dependence on at least one device permission or constraint defined for the device, whether the device is allowed to enrol a specified application installed on the device into a chain of trust provided by a public key infrastructure,
wherein in the chain of trust, a child certificate is attested as valid by an attestor associated with a parent certificate in the chain of trust, and wherein the root of the chain of trust is a root certifying authority which is external to the device; and
enrolling, when it is determined that the device is allowed to enrol the specified application into the chain of trust, the specified application into the chain of trust;
wherein the enrolling comprises generating an application certificate for verifying that the specified application is installed on the device; and
the application certificate is a descendant certificate of a device certificate of the device.

2. The method of claim 1, wherein the application certificate is a child certificate of the device certificate.

3. The method of claim 2, wherein the application certificate is signed with a private key for proving an identity of the device.

4. The method of claim 1, comprising generating a private key for the specified application corresponding to a public key associated with the application certificate.

5. The method of claim 1, wherein the specified application is enrolled into the chain of trust when the specified application is installed on the device.

6. The method of claim 5, wherein the specified application is installed on condition that verification of the identity of the device according to the public key infrastructure is successful.

7. The method of claim 1, comprising selecting whether or not to enrol the specified application into the chain of trust in dependence on information specified by an installation command for instructing installation of the specified application on the device.

8. The method of claim 7, wherein the installation command specifies an enrolment flag specifying whether the application is to be enrolled into the chain of trust.

9. The method of claim 7, wherein the installation command comprises an embedded certificate signing request having a format defined according to the public key infrastructure.

10. The method of claim 1, wherein the device has a normal execution environment and a trusted execution environment in which at least some data or program code is accessible which is inaccessible in the normal execution environment; and
the enrolling of the specified application is performed under control of program code executing in the trusted execution environment.

11. The method of claim 1, wherein the application certificate specifies a version identifier identifying a version of the specified application installed on the device.

12. The method of claim 1, comprising generating a new application certificate for the specified application in response to at least one of:
updating the specified application to a new version;
changing a configuration setting for the specified application;
updating platform program code associated with a software environment in which the specified application is executed; and
changing a configuration setting for the platform program code.

13. The method of claim 12, in which the comprising generating a new application certificate for the specified application in response to at least one of:
updating platform program code associated with a software environment in which the specified application is executed; and changing a configuration setting for the platform program code;
and in which the platform program code comprises at least one of:
system firmware of the device;
an operating system of the device;
a trusted execution environment provided on the device; and
program code for controlling or verifying updates to the program code of the specified application.

14. The method of claim 12, comprising retaining enrolment of a previous application certificate for the specified application in the public key infrastructure after generating the new application certificate.

15. The method of claim 14, in which the new application certificate references the previous application certificate for the specified application.

16. The method of claim 1, comprising generating a chain of application certificates for attesting to the occurrence, or absence of occurrence, of respective events associated with the specified application.

17. The method of claim 1, wherein said at least one device permission or constraint specifies information to be included in the generated application certificate for the specified application.

18. The method of claim 1, comprising storing the generated application certificate in a storage location accessible to the specified application.

19. The method of claim 1, comprising returning the generated application certificate to a requester which triggered installation or update of the specified application.

20. The method of claim 1, wherein the device is configured to make the application certificate accessible to a verifier requesting verification of whether the specified application is installed on the device.

21. The method of claim 1, wherein the application certificate comprises an X.509 certificate.

22. A non-transitory, computer-readable storage medium storing a computer program, which when executed, causes an electronic device to perform the method of claim 1.

23. A device comprising:
a device memory, and
processing circuitry configured to:
   determine, in dependence on at least one device permission or constraint defined for the device, whether the device is allowed to enrol a specified application installed on the device memory into a chain of trust provided by a public key infrastructure,
   wherein in the chain of trust, a child certificate is attested as valid by an attestor associated with a parent certificate in the chain of trust, and wherein the root of the chain of trust is a root certifying authority which is external to the device;
   enrol, when it is determined that the device is allowed to enrol the specified application into the chain of trust, the specified application into the chain of trust;
   wherein enrolling of the specified application comprises generating an application certificate for verifying that the specified application is installed on the device memory; and
   wherein the application certificate is a descendant certificate of a device certificate of the device.

* * * * *